US009950609B2

(12) United States Patent
Takehana et al.

(10) Patent No.: US 9,950,609 B2
(45) Date of Patent: Apr. 24, 2018

(54) POWER GENERATION DEVICE

(71) Applicant: JHL CO., LTD., Iruma-gun, Saitama (JP)

(72) Inventors: Kiichi Takehana, Saitama (JP); Toshiichi Takehana, Saitama (JP); Koji Takehana, Saitama (JP)

(73) Assignee: JHL CO., LTD., Iruma-gun, Saitama (JP)

( * ) Notice: Subject to any disclaimer, the term of this patent is extended or adjusted under 35 U.S.C. 154(b) by 0 days.

(21) Appl. No.: 15/318,332

(22) PCT Filed: Aug. 22, 2014

(86) PCT No.: PCT/JP2014/072844
§ 371 (c)(1),
(2) Date: Dec. 12, 2016

(87) PCT Pub. No.: WO2015/194058
PCT Pub. Date: Dec. 23, 2015

(65) Prior Publication Data
US 2017/0113536 A1 Apr. 27, 2017

(30) Foreign Application Priority Data

Jun. 17, 2014 (JP) .................... PCT/JP2014/066496

(51) Int. Cl.
*H02K 7/00* (2006.01)
*H02K 7/08* (2006.01)
(Continued)

(52) U.S. Cl.
CPC .......... *B60K 7/0007* (2013.01); *B60K 17/046* (2013.01); *B60K 17/145* (2013.01);
(Continued)

(58) Field of Classification Search
CPC ........... H02K 7/006; H02K 7/08; H02K 7/116
(Continued)

(56) References Cited

U.S. PATENT DOCUMENTS 6,749,532 B2 * 6/2004 Wachauer ................ B60K 1/00
180/65.6
7,530,416 B2 * 5/2009 Suzuki ................ B60K 7/0007
180/65.51
(Continued)

FOREIGN PATENT DOCUMENTS

JP 40-30893 Y1 10/1965
JP 62-160053 A 7/1987
(Continued)

OTHER PUBLICATIONS

English translation of International Preliminary Report on Patentability of PCT/JP2014/072844, dated Dec. 20, 2016, 8 pages.
(Continued)

*Primary Examiner* — John K Kim
(74) *Attorney, Agent, or Firm* — Muncy, Geissler, Olds & Lowe, P.C.

(57) ABSTRACT

A power generation device capable of achieving reduction in size and compactification, and increasing a change gear ratio is provided. In a power generation device 20 of a vehicle including a front wheel as a drive wheel and a rear wheel 13 as a driven wheel, a gear mechanism 30A as an input side gear mechanism in which a ring-shaped internal gear 37 is disposed coaxially with a sun gear 38 and a plurality of intermediate gears 36 are interposed in a ring-shaped space between the internal gear 37 and the sun gear 38 is fixed to the vehicle via a cylinder member 22 as a support shaft having an axis matched with an axis of a cup-shaped joint 51 as a rotation shaft of the rear wheel 13, the internal gear 37 of the gear mechanism 30A is formed to be integrally rotatable with the rear wheel 13, an output shaft 52 penetrating through the cylinder member 22 is fixed to the sun gear 38, and a power generator 53 is provided at the output shaft 52.

6 Claims, 6 Drawing Sheets

(51) Int. Cl.

| | | |
|---|---|---|
| *H02K 7/116* | (2006.01) | |
| *B60K 7/00* | (2006.01) | |
| *B60K 17/04* | (2006.01) | |
| *B60K 17/14* | (2006.01) | |
| *F16H 1/28* | (2006.01) | |
| *F16H 57/029* | (2012.01) | |

(52) U.S. Cl.
 CPC ............. *F16H 1/28* (2013.01); *F16H 57/029* (2013.01); *H02K 7/006* (2013.01); *H02K 7/08* (2013.01); *H02K 7/116* (2013.01); *B60K 2007/0092* (2013.01); *B60Y 2200/91* (2013.01)

(58) Field of Classification Search
 USPC ........................................... 310/67 R, 83, 99
 IPC ..................................... H02K 7/00, 7/08, 7/116
 See application file for complete search history.

(56) References Cited

U.S. PATENT DOCUMENTS

| | | | | |
|---|---|---|---|---|
| 7,845,445 | B2 * | 12/2010 | Cooper | ................ B60K 17/046 180/65.51 |
| 9,200,425 | B2 * | 12/2015 | Takehana | ................ B25J 15/08 |
| 2008/0169141 | A1 * | 7/2008 | Suzuki | ................ B60K 7/0007 180/65.7 |
| 2015/0184356 | A1 | 7/2015 | Takehana | |
| 2017/0113536 | A1 * | 4/2017 | Takehana | ............... H02K 7/116 |

FOREIGN PATENT DOCUMENTS

| | | |
|---|---|---|
| JP | 09-047003 A | 2/1997 |
| JP | 2005-287215 A | 10/2005 |
| JP | 2007-022386 A | 2/2007 |
| JP | 2007-216931 A | 8/2007 |
| JP | 2010-221907 A | 10/2010 |
| JP | 3170663 U | 9/2011 |
| JP | 2014-008540 A | 1/2014 |
| WO | 2014/002651 A1 | 1/2014 |

OTHER PUBLICATIONS

International Search Report of PCT/JP2014/072844.
Office Action of Japanese corresponding application No. 2014-557921 dated Feb. 10, 2015.
Office Action of Japanese corresponding application No. 2014-243509 dated Sep. 1, 2015.
Office Action of Korean corresponding application No. 10-2015-7026680 dated Feb. 17, 2016.

* cited by examiner

POWER GENERATION DEVICE

TECHNICAL FIELD

The present invention relates to a power generation device that performs power generation by a power generator that is connected to a rotation shaft provided in each of various kinds of equipment, a vehicle or the like, via a gear mechanism.

BACKGROUND ART

There has been conventionally known a power generation device in which a pulley for an axle is provided at the axle of non-drive wheels of a vehicle as a rotation shaft, a pulley for a power generator is provided at a rotation shaft of the power generator provided in the vehicle, a belt is laid on the pulley for an axle and the pulley for a power generator, and electric power is generated by rotating the rotation shaft of the power generator with rotation of the non-drive wheel (refer to Patent Literature 1, for example).

CITATION LIST

Patent Literature

Patent Literature 1
  Registered Utility Model Publication No. 3170663

SUMMARY OF INVENTION

Technical Problem

When the outside diameter ratio of the pulley for an axle and the pulley for a power generator is increased in order to increase the power generation capability of the power generator in Patent Literature 1, the outside diameter of the pulley for an axle is made larger than the pulley for a power generator, but since the space between the axle and the floor panel of the vehicle body is limited, increasing the outside diameter of the pulley for an axle is restricted. Further, a large space between the pulley for an axle and the pulley for a power generator is occupied by the belt.

The present invention is made in the light of the aforementioned circumstances, and has an object to provide a power generation device capable of achieving reduction in size and compactification, and increasing a change gear ratio.

Solution to Problem

In order to solve the aforementioned problem, the present invention includes a rotation shaft that rotates by external power, wherein an input side gear mechanism in which a ring-shaped internal gear is disposed coaxially with a sun gear and a plurality of intermediate gears are interposed in a ring-shaped space between the internal gear and the sun gear is fixed to a fixed portion in a vicinity of the rotation shaft via a support shaft having an axis being matched with an axis of the rotation shaft, the internal gear of the input side gear mechanism is formed to be integrally rotatable with the rotation shaft, an output shaft that penetrates through the support shaft is fixed to the sun gear, and a power generator is provided at the output shaft.

According to the configuration, rotation of the rotation shaft is used, rotation of the rotation shaft can be accelerated to be outputted from the output shaft, and a power generation amount by the power generator can be increased. Further, power that is transmitted from the internal gear to the sun gear, or from the sun gear to the internal gear, via the plurality of intermediate gears can be divided among the plurality of intermediate gears, and the intermediate gears can be reduced in size, so that reduction in size and compactification of the gear mechanism can be achieved while torque that is transmitted is ensured.

Further, the present invention is a power generation device of a movable body including a drive wheel and a driven wheel, wherein an input side gear mechanism in which a ring-shaped internal gear is disposed coaxially with a sun gear and a plurality of intermediate gears are interposed in a ring-shaped space between the internal gear and the sun gear is fixed to the movable body via a support shaft having an axis being matched with an axis of a rotation shaft of the driven wheel, the internal gear of the input side gear mechanism is formed to be integrally rotatable with the driven wheel, an output shaft that penetrates through the support shaft is fixed to the sun gear, and a power generator is provided at the output shaft.

According to the configuration, the power which is transmitted from the internal gear to the sun gear or from the sun gear to the internal gear, via the plurality of intermediate gears can be divided among the plurality of intermediate gears, and the intermediate gears can be reduced in size, so that reduction in size and compactification of the gear mechanism, and reduction in size and compactification of the movable body by extension can be achieved while the torque that is transmitted is ensured.

Further, since the number of teeth of the sun gear is smaller than that of the internal gear, the rotation angle of the sun gear can be made larger than that of the internal gear, the rotation of the driven wheel can be accelerated to be outputted from the output shaft, and the power generation amount by the power generator can be increased.

In the above described configuration, an output side gear mechanism in which a ring-shaped internal gear is disposed coaxially with a sun gear and a plurality of intermediate gears are interposed in a ring-shaped space between the internal gear and the sun gear may be fixed to the support shaft, the output shaft may be fixed to the sun gear of the output side gear mechanism, an inner rotor of the power generator may be fixed onto the output shaft, and an outer rotor of the power generator that is disposed to surround the inner rotor may be fixed to the internal gear of the output side gear mechanism. According to the configuration, a number of relative rotations can be increased by rotating the inner rotor and the outer rotor in the opposite directions, and the power generation amount by the power generator can be increased more.

Further, in the above described configuration, the input side gear mechanism and the output side gear mechanism may be housed in gear boxes, and O-rings may be provided between a pair of side plates that configure each of the gear boxes and the internal gear, and an inside of each of the gear boxes may be sealed. According to the configuration, dust, muddy water, foreign matters and the like can be prevented from entering into the gear boxes.

Further, in the above described configuration, a rotor of the power generator may be fixed onto the output shaft, and a stator of the power generator that is disposed to surround the rotor may be fixed to the fixed portion. According to the configuration, electric power can be generated by the generator by rotating the rotor relatively to the stator. Further, since the stator is directly mounted to the fixed portion, the power generation device can be reduced in size and compactified more.

Advantageous Effects of Invention

The present invention includes the rotation shaft that rotates by external power, wherein the input side gear mechanism in which the ring-shaped internal gear is disposed coaxially with the sun gear and the plurality of intermediate gears are interposed in the ring-shaped space between the internal gear and the sun gear is fixed to the fixed portion in the vicinity of the rotation shaft via the support shaft having the axis being matched with the axis of the rotation shaft, the internal gear of the input side gear mechanism is formed to be integrally rotatable with the rotation shaft, the output shaft that penetrates through the support shaft is fixed to the sun gear, and the power generator is provided at the output shaft, so that rotation of the rotation shaft is used, the rotation of the rotation shaft can be accelerated to be outputted from the output shaft, and the power generation amount by the power generator can be increased. Further, the power which is transmitted from the internal gear to the sun gear or from the sun gear to the internal gear, via the plurality of intermediate gears can be divided among the plurality of intermediate gears, and the intermediate gears can be reduced in size, so that reduction in size and compactification of the gear mechanism can be achieved while the torque that is transmitted is ensured.

DESCRIPTION OF EMBODIMENTS

Hereinafter, embodiments of the present invention will be described with reference to the drawings.

First Embodiment

Figure 1:
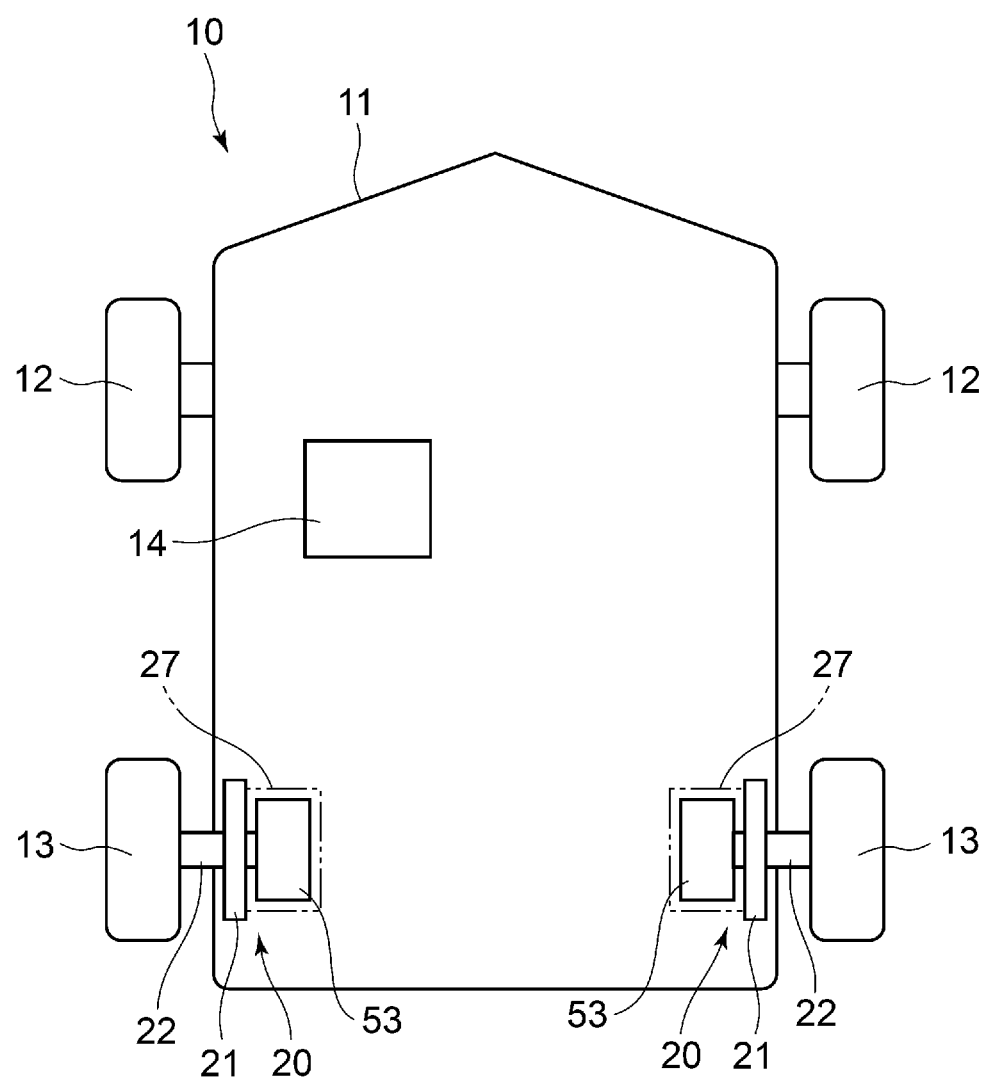
FIG. 1 is a schematic view showing a vehicle loaded with a power generation device of a first embodiment according to the present invention.

FIG. 1 is a schematic view showing a vehicle 10 that is loaded with a power generation device 20 of a first embodiment according to the present invention.

The vehicle 10 includes a vehicle body 11, front wheels 12 and 12 as a pair of left and right drive wheels and a pair of left and right rear wheels 13 and 13 as non-drive wheels, which are rotatably supported at the vehicle body 11, a power unit 14 that drives the front wheels 12 and 12, and a pair of left and right power generation devices 20 and 20 that are respectively connected to the rear wheels 13 and 13. By connecting the power generation devices 20 respectively to the left and right rear wheels 13 and 13 in this way, it becomes possible to keep weight balance between left and right of the vehicle 10, and equalize resistance at the time of the rear wheels 13 rotating between left and right.

The front wheels 12 and 12 are connected to a steering device (not illustrated) that is supported at the vehicle body 11, and are steered to left and right by a steering operation of a driver who rides on the vehicle. The power unit 14 is composed of an engine or an electric motor, or the engine and the electric motor. In the case of the engine, a fuel tank that stores fuel for the engine is included, and in the case of the electric motor, a driving battery that drives the electric motor, and a charger that charges the driving battery are included. In either case of the engine and the electric motor, an auxiliary machinery battery that supplies electric power to an auxiliary component included in the vehicle may be loaded. Electric power that is generated in the power generation devices 20 and 20 are stored in the driving battery and the auxiliary machinery battery.

The power unit 14 is connected to the front wheels 12 and 12 directly or via a clutch and a transmission. The rear wheels 13 and 13 are rotatably supported at the vehicle body 11 via parts of the power generation devices 20 and 20 that will be described in detail later.

Figure 2:
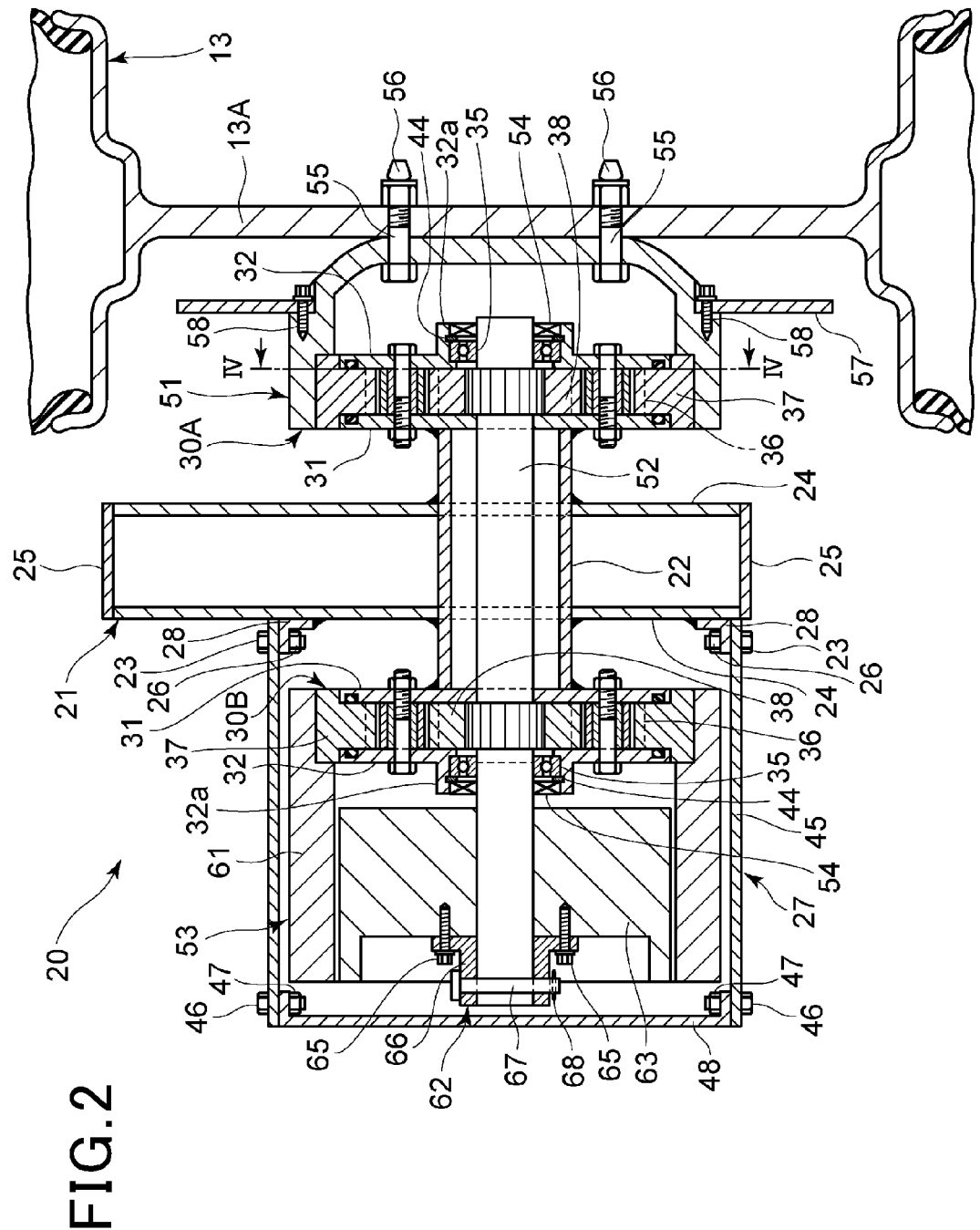
FIG. 2 is a sectional view showing the power generation device that is connected to a rear wheel.

FIG. 2 is a sectional view showing the power generation device 20 which is connected to the rear wheel 13.

The power generation device 20 includes a fixed member 21 that is fixed to the vehicle body 11 (refer to FIG. 1) or configures a part of the vehicle body 11, a cylinder member 22 that is mounted to the fixed member 21, gear mechanisms 30A and 30B that are respectively mounted to both end portions of the cylinder member 22, a cup-shaped joint 51 that connects each of one gear mechanism 30A and the rear wheel 13, an output shaft 52 that is laid into the two gear mechanisms 30A and 30B, and a power generator 53 that has the output shaft 52 as a rotation shaft and is provided at the other gear mechanism 30B.

The fixed member 21 is composed of a pair of vertical plates 24 and 24 that are disposed by being separated in an axial direction of the cylinder member 22, and a pair of lateral plates 25 and 25 that are mounted to end portions of the vertical plates 24 and 24.

The cylinder member 22 penetrates through the vertical plates 24 and 24 of the fixed member 21, and is mounted to the vertical plates 24 and 24 by welding.

The gear mechanisms 30A and 30B are transmission mechanisms that include a plurality of gears, and accelerate or decelerate outputs with respect to inputs, and reduction in size, reduction in weight and compactification are achieved by configurations of the gears.

The cut-shaped joint 51 is a member corresponding to an axle of the rear wheel 13, and is formed into a cup shape with a center being recessed, an outer circumferential portion of the cup is mounted to an outer circumferential portion of the gear mechanism 30A, and a bottom portion of the cup is mounted to a wheel 13A that configures the rear wheel 13 with a plurality of bolts 55 and nuts 56. Note that reference sign 57 denotes a brake disk that is mounted to the outer circumferential portion of the cup-shaped joint 51 with a plurality of bolts 58, and is a component that is braked by a brake caliper that configures a disk brake not illustrated. As a material of the cut-shaped joint 51, light metals such as an aluminum, magnesium, titanium, or alloys of these metals are preferable, in order to make the vehicle weight and the moment of inertia smaller.

As illustrated, the gear mechanism 30A and the cup-shaped joint 51 are formed to be small so as to be inside the wheel 13A of the rear wheel 13 and included in a width of the rear wheel 13.

The output shaft 52 penetrates through the inside of the cylinder member 22 and is rotatably supported by the gear mechanisms 30A and 30B. The power generator 53 includes a cylindrical outer rotor 61 that is mounted to an outer circumferential portion of the gear mechanism 30B, and an inner rotor 63 that is mounted to the output shaft 52 via a mounting tool 62, and generates electric power by relative rotation of the outer rotor 61 and the inner rotor 63.

The mounting tool 62 includes a joint member 66 that is mounted on one side surface of the inner rotor 63 with a plurality of bolts 65, a connection pin 67 that penetrates through each of the joint member 66 and the output shaft 52, and a split pin 68 that penetrates through a distal end portion of the connection pin 67 as a retainer for the connection pin 67.

Since the gear mechanism 30B and the power generator 53 are supported by the cylinder member 22 at one side, the support member can be decreased as compared with a case where the gear mechanism 30B and the power generator 53 are supported at both sides, the weight, cost and a space of occupancy can be decreased.

Reference sign 27 in the drawing denotes a cover member that covers peripheries of the gear mechanism 30B and the power generator 53, and protects the power generator 53 from rainwater, muddy water, dust and the like that are spattered from road surfaces to the vehicle body. The cover member 27 is mounted to cover support members 28 and 28 that are mounted to a side surface of the vertical plate 24 of the fixed member 21 with bolts 23 and nuts 26. The cover member 27 is composed of a cylindrical cover main body 45 that is mounted to the cover support members 28 and 28, and a lid member 48 that are detachably mounted to the cover main body 45 with bolts 46 and nuts 47. In the cover member 27, a conducting wire insertion hole (not illustrated) for passing a conducting wire (not illustrated) that takes generated electric power to an outside from the power generator 53 is opened.

Figure 3:
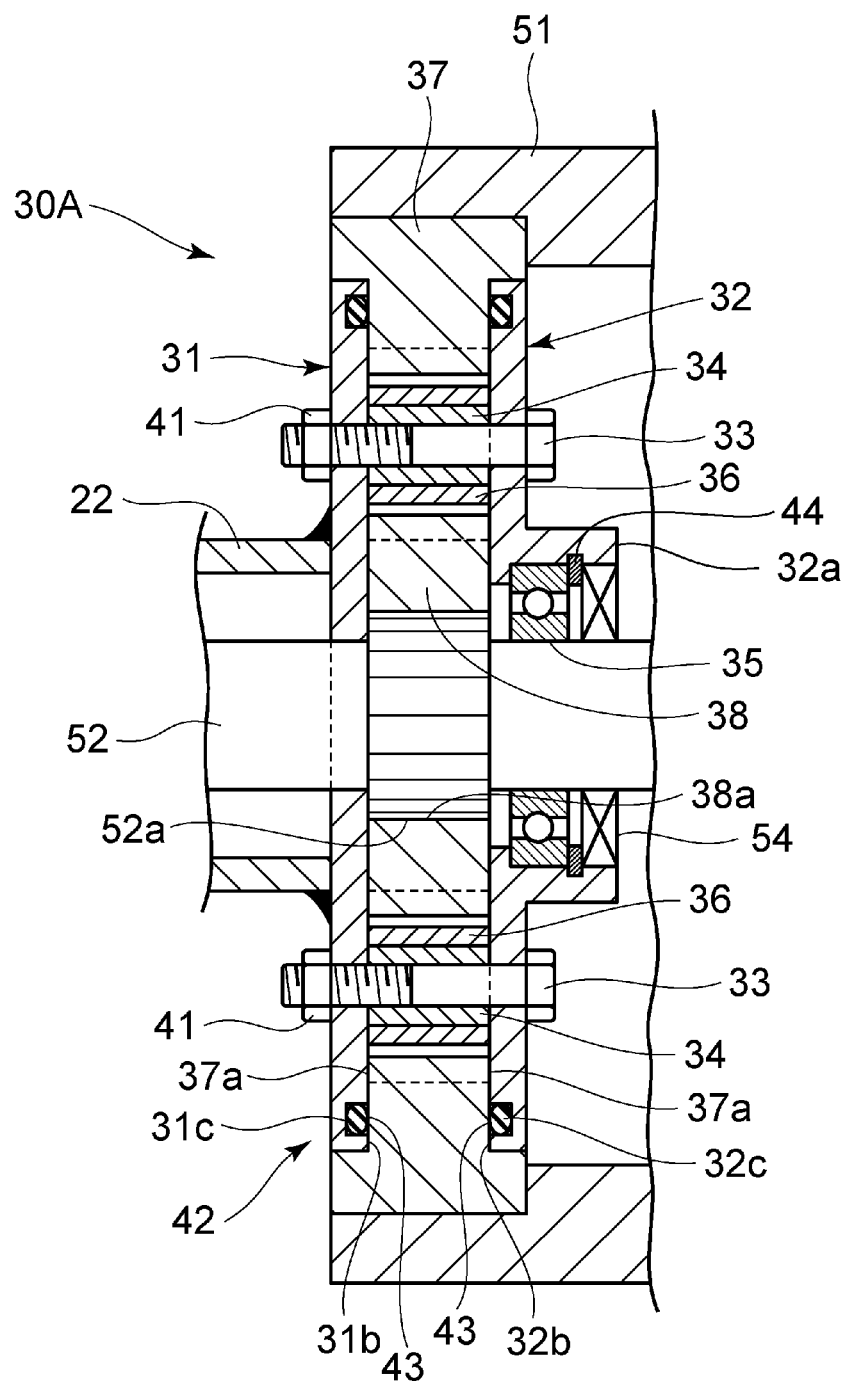
FIG. 3 is an enlarged view of a main part of the power generation device shown in FIG. 2.
Figure 4:
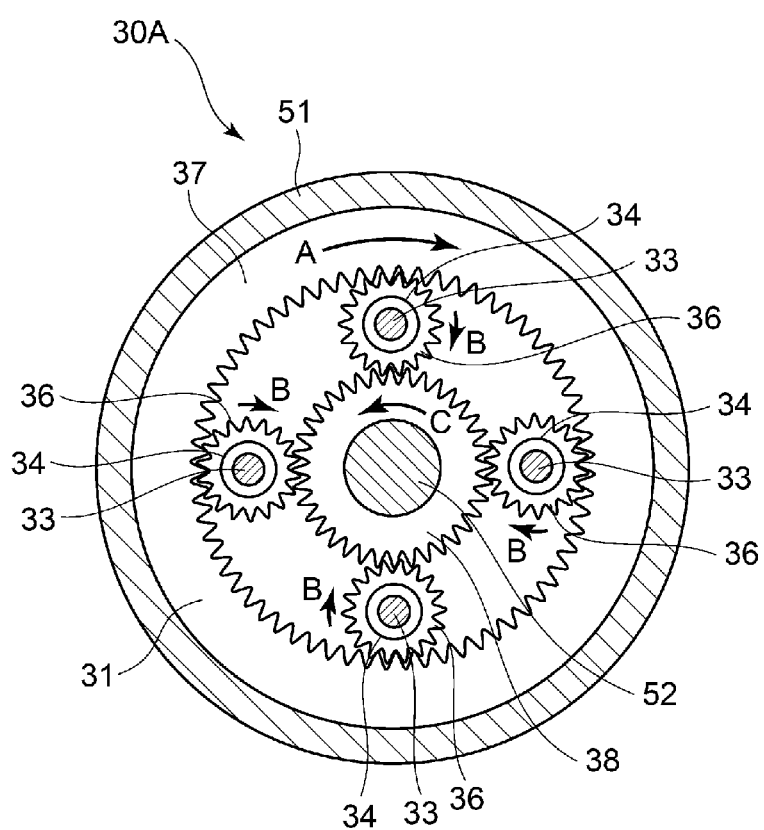
FIG. 4 is a sectional view taken along line IV-IV in FIG. 2.

FIG. 3 is an enlarged view of a main part of the power generation device 20 shown in FIG. 2, and FIG. 4 is a sectional view taken along line IV-IV in FIG. 2.

As shown in FIG. 3 and FIG. 4, the gear mechanism 30A includes a side plate 31 that is mounted to an end portion of the cylinder member 22 by welding, a side plate 32 that is disposed by being separated to face the side plate 31, a plurality of collars 34 that are respectively mounted to the side plates 31 and 32 with a plurality of bolts 33, intermediate gears 36 that are rotatably supported by the respective collars 34, a ring-shaped internal gear 37 that is disposed at outsides of the plurality of intermediate gears 36 to be meshed with the intermediate gears 36, and a sun gear 38 that is meshed with the plurality of intermediate gears 36 and is spline-connected to the output shaft 52.

The side plates 31 and 32 are disks, the output shaft 52 penetrates through one side plate 31, and the other side plate 32 rotatably supports the distal end portion of the output shaft 52 via a ball bearing 35.

In more detail, the side plate 32 integrally includes a cylinder portion 32a that protrudes along the axial direction of the output shaft 52. The cylinder portion 32a has the ball bearing 35, a retaining ring 44 that retains the ball bearing 35, and an oil seal 54 provided at an opening portion side of the cylinder portion 32a disposed inside the cylinder portion 32a.

The collar 34 is in a cylindrical shape, the bolt 33 penetrates through the side plates 31 and 32 and the collar 34 in a state where the collar 34 is sandwiched between the side plates 31 and 32, and a nut 41 is screwed and connected to a distal end portion of the bolt 33.

Since a plurality of intermediate gears 36 are provided, it becomes possible to transmit torque to the sun gear 38 from the internal gear 37 by dividing the torque among the plurality of intermediate gears 36.

In the internal gear 37, an outer circumferential portion of the cup-shaped joint 51 is fitted onto an outer circumferential portion of the internal gear 37, and is mounted by welding. The outer circumferential portion of the internal gear 37 is located more outward in a radial direction than outer circumferential edges of the side plates 31 and 32, and an outside diameter of the internal gear 37 is larger than outside diameters of the side plates 31 and 32. Thereby, the cup-shaped joint 51 can be easily mounted to the outer circumferential portion of the internal gear 37.

A ratio of the numbers of teeth of the internal gear 37 and the sun gear 38 is 2:1, for example, and when the internal gear 37 rotates, the rotation of the internal gear 37 is transmitted to the sun gear 38 via the plurality of intermediate gears 36, and a rotation angle of the sun gear 38 is twice as large as a rotation angle of the internal gear 37.

In the gear mechanism 30A, in a state where the plurality of collars 34 are disposed between the pair of side plates 31 and 32, the side plates 31 and 32 are fastened with the bolts 33 that penetrate through the side plates 31 and 32 and the plurality of collars 34 and nuts 41 that are screwed and connected to the bolts 33. As a result, a distance between the side plates 31 and 32 is kept constant, a clearance between the intermediate gear 36 and the side plates 31 and 32 becomes constant, and rotation of the intermediate gear 36 can be stabilized. The collar 34 has a function of keeping the distance between the side plates 31 and 32 described above constant, and a function of rotatably supporting the intermediate gear 36, and therefore, can reduce the number of components and reduce the cost.

The pair of side plates 31 and 32 configure a gear box 42 that houses the plurality of intermediate gears 36, the internal gear 37 and the sun gear 38.

In the internal gear 37, side surfaces 37a and 37a are slidably supported by the pair of side plates 31 and 32. Ring-shaped O-ring grooves 31c and 32c are formed at an outer circumferential side of inner side surfaces 31b and 32b of the side plates 31 and 32, O-rings 43 are respectively disposed in the O-ring grooves 31c and 32c, and gaps between the side plates 31 and 32 and the internal gear 37 are sealed. By providing the O-rings 43 in this way, dust, mud, rainwater and the like can be prevented from entering into the gear box 42, and influence of abrasion or the like of gear rotation support portions and gear meshing portions in the gear box 42 can be suppressed.

The output shaft 52 has a male spline 52a formed at an end portion. The male spline 52a is spline-connected to a female spline 38a that is formed at the sun gear 38, and power is transmitted from the sun gear 38 to the output shaft 52.

The gear mechanism 30B shown in FIG. 2 have the same structure as the gear mechanism 30A, and differs from the gear mechanism 30A only in mounting orientation. By using the gear mechanisms 30A and 30B of the same structures in this way, the cost of the gear boxes 42 can be suppressed.

Although in FIG. 2, ball bearings 35 are provided at the respective side plates 32 of the gear mechanisms 30A and 30B, the present invention is not limited to this, the ball bearings 35 may be provided at the respective side plates 31 of the gear mechanisms 30A and 30B to support the output shaft 52.

An operation of the gear mechanism 30A described above will be described next.

When the internal gear 37 rotates as shown by arrow A in FIG. 4, the respective intermediate gears 36 rotate as shown by arrows B, and the sun gear 38 and the output shaft 52 integrally rotate as shown by arrow C. At this time, the sun gear 38 rotates in an opposite direction with respect to the internal gear 37, and a rotation angle of the sun gear 38 is doubled with respect to the rotation angle of the internal gear 37. For example, when the internal gear 37 rotates 360° (one rotation), the sun gear 38 rotates 720° (two rotations). As relative rotation, the sun gear 38 rotates 360+720=1080° with respect to the rotation angle of 360° of the internal gear 37. In other words, the sun gear 38 makes three rotations with respect to the internal gear 37 while the internal gear 37 makes one rotation.

Further, in the gear mechanism 30B shown in FIG. 2, the sun gear 38 rotates with the output shaft 52, whereby rotation of the sun gear 38 is transmitted to the internal gear 37 via the plurality of intermediate gears 36, and therefore, a transmission direction of torque becomes opposite from a transmission direction in the gear mechanism 30A. However, since the ratio of the numbers of teeth of the internal gear 37 and the sun gear 38 of the gear mechanism 30B are the same as that of the gear mechanism 30A, and therefore, the numbers of relative rotations are the same.

An example in which the ratio of the number of teeth of the internal gear 37 and the sun gear 38 is made 2:1 in the gear mechanisms 30A and 30B is shown, but the ratio is not limited to this, and may be arbitrarily changed in accordance with specifications of the power generator 53 (refer to FIG. 2), a use situation of the driving battery, a use environment of the vehicle 10 (refer to FIG. 1) and the like.

Since torque that is transmitted from the internal gear 37 to the sun gear 38 is dispersed by the plurality (four) of intermediate gears 36, the torque which is transmitted by the single intermediate gear 36 can be made smaller, and the intermediate gear 36 can be reduced in size by reducing the outside diameter and the width. If the intermediate gear 36 is reduced in size, the distance between the internal gear 37 and the sun gear 38 can be reduced, and the internal gear 37 can be reduced in diameter. As a result, reduction in size and compactification and reduction in weight of the gear mechanisms 30A and 30B (refer to FIG. 2 for the gear mechanism 30B) can be achieved. Note that the number of intermediate gears 36 is not limited to the above described number, but can be a plural number.

As shown in FIG. 1 to FIG. 4 as above, in the power generation device 20 for the vehicle 10 as a moving body including the front wheels 12 and 12 as drive wheels and the rear wheels 13 and 13 as driven wheels, the gear mechanism 30A as an input side gear mechanism in which the ring-shaped internal gear 37 is disposed coaxially with the sun gear 38, and the plurality of intermediate gears 36 are interposed in a ring-shaped space between the internal gear 37 and the sun gear 38, is fixed to the vehicle body 11 of the vehicle 10 via the cylinder member 22 as a support shaft having an axis matched with an axis of the cup-shaped joint 51 as the rotation shaft of the rear wheel 13, the internal gear 37 of the gear mechanism 30A is formed to be integrally rotatable with the rear wheel 13, the output shaft 52 that penetrates through the cylinder member 22 is fixed to the sun gear 38, and the power generator 53 is provided at the output shaft 52.

According to the configuration, the power which is transmitted from the internal gear 37 to the sun gear 38 via the plurality of intermediate gears 36, or from the sun gear 38 to the internal gear 37 (in the case of the gear mechanism 30B) can be divided among the plurality of intermediate gears 36, and the intermediate gears 36 can be reduced in size, and therefore, reduction in size and compactification of the gear mechanisms 30A and 30B, and reduction in size and compactification of the vehicle 10 by extension can be achieved while torque that is transmitted is ensured.

Further, since the number of teeth of the sun gear 38 is smaller than the number of teeth of the internal gear 37, the rotation angle of the sun gear 38 can be made larger than the rotation angle of the internal gear 37, power can be outputted from the output shaft 52 by accelerating rotation of the rear wheel 13, and a power generation amount by the power generator 53 can be increased.

Further, as shown in FIG. 2 and FIG. 3, the gear mechanism 30B as an output side gear mechanism in which the ring-shaped internal gear 37 is disposed coaxially with the sun gear 38, and the plurality of intermediate gears 36 are interposed in a ring-shaped space between the internal gear 37 and the sun gear 38 is fixed to the cylinder member 22, the output shaft 52 is fixed to the sun gear 38 of the gear mechanism 30B, the inner rotor 63 of the power generator 53 is fixed onto the output shaft 52, and the outer rotor 61 of the power generator 53, which is disposed to surround the inner rotor 63, is fixed to the internal gear 37 of the gear mechanism 30B, so that a number of relative rotations can be increased by rotating the inner rotor 63 and the outer rotor 61 in opposite directions, and the power generation amount by the power generator 53 can be increased more.

Further, as shown in FIG. 3, the gear mechanism 30A and the gear mechanism 30B are respectively housed in the gear boxes 42, the O-rings 43 are provided between the pair of side plates 31 and 32 that configure each of the gear boxes 42, and the internal gear 37, and the inside of each of the gear boxes 42 is sealed, so that dust, muddy water, foreign matters and the like can be prevented from entering into the gear boxes 42.

Second Embodiment

Figure 5:
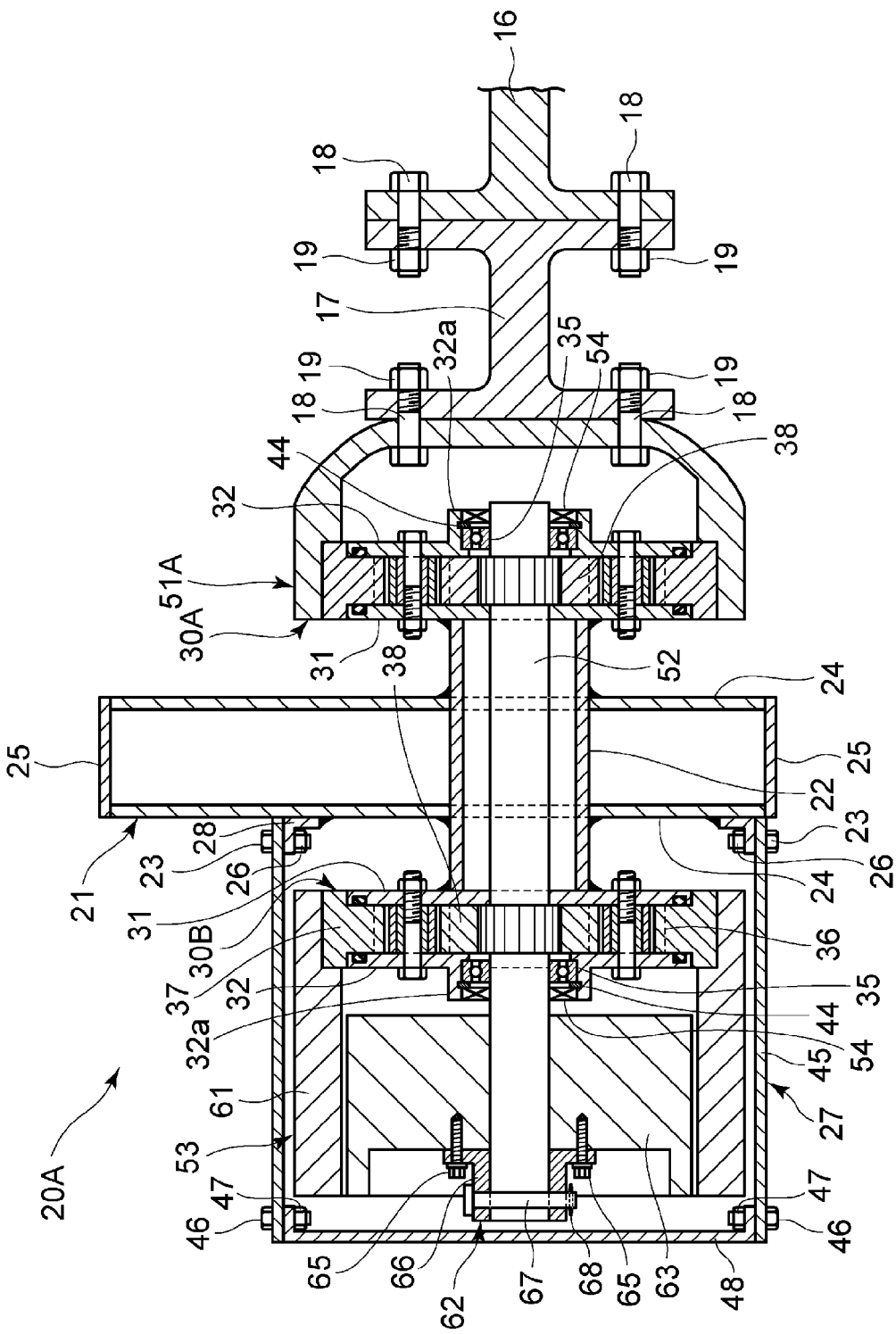
FIG. 5 is a sectional view showing a second embodiment in which a power generation device is applied to a machine other than a vehicle.

FIG. 5 is a sectional view showing a second embodiment in which a power generation device 20A is applied to a machine other than the vehicle 10 (refer to FIG. 1). The same components as in the first embodiment shown in FIG. 2 will be assigned with the same reference signs, and explanation will be omitted.

In the power generation device 20A, only a cup-shaped joint 51A differs from the cup-shaped joint 51 of the power generation device 20 (refer to FIG. 2). That is, in the cup-shaped joint 51A, the brake disk 57 that is mounted to the cup-shaped joint 51A, the plurality of bolts 58 for mounting the brake disk 57, a ring-shaped recessed portion in which the brake disk 57 is disposed, and female screws into which the bolts 58 are screwed are not provided.

The power generation device 20A is connected to a rotation shaft 16 of each of various machines, devices and the like that are installed in plants or the like via a joint 17, for example. The joint 17 is fastened to the rotation shaft 16 and the cup-shaped joint 51A respectively with bolts 18 and nuts 19.

By connecting the power generation device 20A to the rotation shaft 16 of each of various devices in this way, the power generation device 20A can be installed without occupying a large space, can respond to a large change speed ratio, and can increase the power generation amount of the power generator 53.

Note that connection of the rotation shaft 16 and the power generation device 20A is not limited to the above described joint 17, but joint means of another mode may be used.

In the cover member 27, an openable and closable opening may be provided to release heat that is accumulated inside to outside. Further, in a case of using the power generation device 20A inside a plant or the like, the power generator 53 is protected from dust and the like with the cover member 27, but in an environment with less dust and the like, the cover member 27 does not have to be provided.

As shown in FIG. 3, FIG. 4 and FIG. 5 as above, the gear mechanism 30A including the rotation shaft 16 that rotates by external power, wherein the ring-shaped internal gear 37 is disposed coaxially with the sun gear 38, and the plurality of intermediate gears 36 are interposed in a ring-shaped space between the internal gear 37 and the sun gear 38 is fixed to the fixed member 21 as a fixed portion in the vicinity of the rotation shaft 16 via the cylinder member 22 having the axis matched with an axis of the rotation shaft 16, the internal gear 37 of the gear mechanism 30A is formed to be integrally rotatable with the rotation shaft 16, the output shaft 52 that penetrates through the cylinder member 22 is fixed to the sun gear 38, and the power generator 53 is provided at the output shaft 52.

According to the configuration, rotation of the rotation shaft 16 is used, the rotation of the rotation shaft 16 is accelerated and can be outputted from the output shaft 52, and the power generation amount by the power generator 53 can be increased.

Third Embodiment

Figure 6:
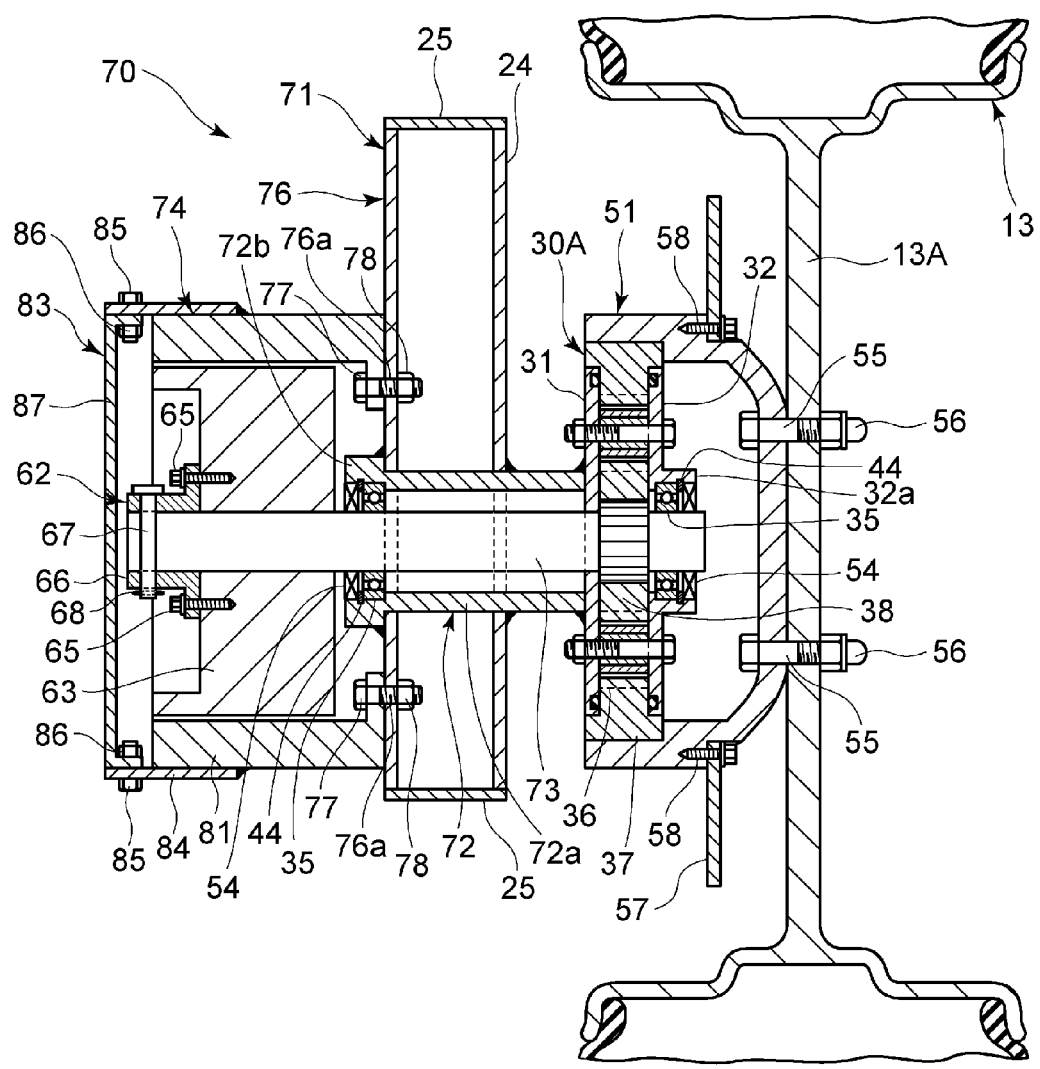
FIG. 6 is a sectional view showing a power generation of a third embodiment.

FIG. 6 is a sectional view showing a power generation device 70 of a third embodiment.

The same components as in the first embodiment shown in FIG. 2 will be assigned with the same reference sings, and explanation will be omitted.

In the power generation device 70, the gear mechanism 30B is omitted, in contrast with the power generation device 20 (refer to FIG. 2) of the first embodiment. That is, the power generation device 70 includes a fixed member 71 that is fixed to the vehicle body 11 (refer to FIG. 1), or configures a part of the vehicle body 11, a cylinder member 72 that is mounted to the fixed member 71, the gear mechanism 30A that is mounted to one end portion of the cylinder member 72, an output shaft 73 that is mounted to the gear mechanism 30A, and a power generator 74 that has the output shaft 73 as a rotation shaft and is mounted to the fixed member 71.

The fixed member 71 is composed of a pair of vertical plates 24 and 76 that are mounted to the cylinder member 72 by being separated in an axial direction, and lateral plates 25 and 25 that are mounted to end portions of the vertical plates 24 and 76. In the vertical plate 76, a plurality of bolt insertion holes 76a in which bolts 77 for mounting the power generator 74 are passed are opened.

The cylinder member 72 is configured by a small diameter portion 72a that penetrates through the vertical plates 24 and 76 of the fixed member 71 and is mounted to the vertical plate 24 by welding, and a large diameter portion 72b that is integrally provided at one end portion of the small diameter portion 72a.

The small diameter portion 72a has the other end portion mounted to the side plate 31 of the gear mechanism 30A by welding.

The large diameter portion 72b has the ball bearing 35 that rotatably supports the output shaft 73, the retaining ring 44, and the oil seal 54 that is provided at an opening portion side of the large diameter portion 72b disposed inside of the large diameter portion 72b.

The power generator 74 includes a cylindrical stator 81 that is mounted to the vertical plate 76 of the fixed member 71 with bolts 77 and nuts 78, and the rotor 63 (that is, the inner rotor 63) that is mounted to the output shaft 73 via the mounting tool 62, and generates electric power by the rotor 63 rotating relatively to the stator 81.

An end portion of the power generator 74 is covered with a cover member 83, and the power generator 74 is protected from rainwater, muddy water, dust and the like. The cover member 83 is composed of a cylinder member 84 that is mounted to an outer circumferential surface of the stator 81, and a lid member 87 that is mounted to the cylinder member 84 with a plurality of bolts 85 and nuts 86.

An operation of the power generation device 70 described above will be described next.

When the internal gear 37 rotates with the rear wheel 13 in FIG. 4 and FIG. 6, the sun gear 38 and the output shaft 73 rotate via the respective intermediate gears 36. When the ratio of the numbers of teeth of the internal gear 37 and the sun gear 38 is 2:1, the output shaft 73 makes two rotations when the rear wheel 13 and the internal gear 37 make one rotation. Since the stator 81 of the power generator 74 is fixed to the fixed member 71, relative rotation of the rotor 63 of the power generator 74, which is integrally provided at the output shaft 73, and the stator 81 is two rotations.

The electric power generated by the power generator 74 is stored in the auxiliary machinery battery and the driving battery which are loaded on the vehicle 10 (refer to FIG. 1).

The power generation device 70 of the present embodiment may be connected to the rotation shaft 16 via the joint 17 as shown in FIG. 5 by using the cup-shaped joint 51A (refer to FIG. 5) instead of the cup-shaped joint 51.

Although in FIG. 6, the ball bearing 35 is provided in the side plate 32 of the gear mechanism 30A, the present invention is not limited to this, and the ball bearing 35 may be provided in the side plate 31 of the gear mechanism 30A to support the output shaft 73.

As shown in FIG. 3 and FIG. 6 as above, the rotor 63 of the power generator 74 is fixed onto the output shaft 73 of the power generation device 70, and the stator 81 of the power generator 74 that is disposed to surround the rotor 63 is fixed to the fixed member 71 as the fixed portion, so that the rotor 63 is rotated with respect to the stator 81 and electric power can be generated by the power generator 74. Further, since the stator 81 is directly mounted to the fixed member 71, the power generation device 70 can be more reduced in size and compactified.

The aforementioned embodiments each illustrate only one aspect of the present invention, and modification and application can be made arbitrarily within the range without departing from the gist of the present invention.

For example, in the above described embodiment, the power generation device of the present invention is applied to a four-wheeled vehicle with two front wheels and two rear wheels as the vehicle 10 as shown in FIG. 1, the present invention is not limited to this, and the power generation device of the present invention may be applied to a tricycle and a bicycle as a vehicle.

Further, as shown in FIG. 2, the internal gear 51 of the gear mechanism 30A is mounted to the wheel 13A of the rear wheel 13 via the cup-shaped joint 51, but the present invention is not limited to this, and the internal gear 37 may be directly mounted to the wheel 13A with bolts and nuts.

Thereby, the length in an axial direction of the power generation device can be reduced.

REFERENCE SIGNS LIST

10 Vehicle (movable body)
12 Front wheel (drive wheel)
13 Rear wheel (driven wheel)
16 Rotation shaft
20, 20A, 70 Power generation device
21, 71 Fixed member (fixed portion)
22, 72 Cylinder member (support shaft)
30A Gear mechanism (input side gear mechanism)
30B Gear mechanism (output side gear mechanism)
31, 32 Side plate
36 Intermediate gear
37 Internal gear
38 Sun gear
42 Gear box
43 O-ring
51, 51A Cup-shaped joint (rotation shaft)
52, 73 Output shaft
53, 74 Power generator
61 Outer rotor
63 Inner rotor, rotor
81 Stator

The invention claimed is:

1. A power generation device,
wherein an input side gear mechanism is supported at one end portion of a hollow support shaft,
an output side gear mechanism is supported at the other end portion of the hollow support shaft,
each of the gear mechanisms is configured by having one side plate that is formed to be a flat plate and is fixed to an end portion of the support shaft and the other side plate that is formed to be a flat plate and is formed to support a bearing on an outer surface, a ring-shaped internal gear disposed coaxially with a sun gear, and a plurality of intermediate gears interposed in a ring-shaped space between the internal gear and the sun gear, between the pair of side plates,
the internal gear of the input side gear mechanism is driven by external power,
an output shaft that extends in hollowness of the support shaft to connect the sun gears of the respective gear mechanisms, penetrates through pairs of side plates and is rotatably supported by the bearings provided at outer surfaces of the respective other side plates is included, and
an inner rotor of a power generator is fixed to the output shaft extending from the output side gear mechanism, and an outer rotor of the power generator is fixed to the internal gear of the output side gear mechanism to surround the inner rotor.

2. The power generation device according to claim 1, wherein the internal gear of the input side gear mechanism is connected to a driven wheel of a movable body.

3. The power generation device according to claim 1, wherein the internal gear of the input side gear mechanism is connected to a rotation shaft that rotates by external power.

4. The power generation device according to claim 1, wherein the input side gear mechanism and the output side gear mechanism are housed in gear boxes, O-rings are provided between the pairs of side plates that configure the gear boxes and the internal gears, and insides of the gear boxes are sealed.

5. The power generation device according to claim 2, wherein the input side gear mechanism and the output side gear mechanism are housed in gear boxes, O-rings are provided between the pairs of side plates that configure the gear boxes and the internal gears, and insides of the gear boxes are sealed.

6. The power generation device according to claim 3, wherein the input side gear mechanism and the output side gear mechanism are housed in gear boxes, O-rings are provided between the pairs of side plates that configure the gear boxes and the internal gears, and insides of the gear boxes are sealed.

* * * * *